Oct. 9, 1956  J. E. MAHAN ET AL  2,766,248
PROCESS FOR THE PRODUCTION OF ALKYL PYRIDINES
Filed June 26, 1953

INVENTORS
J. E. MAHAN
C. E. BECKER
BY Hudson & Young
ATTORNEYS

United States Patent Office 2,766,248
Patented Oct. 9, 1956

2,766,248

PROCESS FOR THE PRODUCTION OF ALKYL PYRIDINES

John E. Mahan, Bartlesville, Okla., and Charles E. Becker, Pasadena, Tex., assignors to Phillips Petroleum Company, a corporation of Delaware Application June 26, 1953, Serial No. 364,252

11 Claims. (Cl. 260—290)

This invention relates to an improved process for the production of alkyl pyridines. In one of its aspects this invention relates to an improved process for the production of paraldehyde. In another of its aspects this invention relates to the prevention of reversion of paraldehyde. In still another aspect this invention relates to a mixture of acetaldehyde and paraldehyde containing sufficient stabilizer to prevent reversion of the paraldehyde to acetaldehyde.

It is known that alkyl pyridines can be produced by interaction of aldehydes or ketones with ammonia in the presence of a suitable catalyst. Acetaldehyde can be used as the starting material for the synthesis of alkyl pyridines, particularly 2 - methyl - 5 - ethylpyridine, but a yield less than 50 percent is generally obtained. However, if acetaldehyde is first converted to paraldehyde, yields of alkyl pyridines as high as 75 or 80 percent or even higher can be readily obtained. One method of operation is to convert the acetaldehyde to paraldehyde in the presence of an acid catalyst such as sulfuric acid, neutralize the acid catalyst with an excess of an alkali metal carbonate or hydroxide, remove the unreacted acetaldehyde from the paraldehyde by distillation, and transfer the bottoms product containing the paraldehyde to a reactor where it is contacted with ammonia, in the presence of a suitable catalyst, under conditions such that alkyl pyridines are obtained.

When acetaldehyde is treated with an acid-type catalyst, an equilibrium mixture of acetaldehyde with paraldehyde is formed. It is desirable that unchanged acetaldehyde be removed from this equilibrium mixture in order that an optimum yield of the desired alkyl pyridine can be obtained. It would appear that treatment with an excess of an inorganic basic material to neutralize the acid catalyst, followed by removal of the acetaldehyde by distillation, would accomplish the desired result. However, it has been found that upon distillation of such a reaction mixture, a substantial amount of the paraldehyde undergoes reversion to acetaldehyde thereby greatly reducing the quantity of paraldehyde which is available for the pyridine synthesis step.

It is therefore an object of this invention to provide an improved process for the production of alkyl pyridines.

Another object of this invention is to provide an improved process for the production of paraldehyde.

Still another object of this invention is to prevent reversion of paraldehyde to acetaldehyde.

A further object of this invention is to provide an improved method of resolving a mixture of acetaldehyde and paraldehyde which has been stabilized to prevent reversion of the paraldehyde to acetaldehyde.

Another object of this invention is to provide a mixture of acetaldehyde and paraldehyde which has been stabilized to prevent reversion of the paraldehyde to acetaldehyde.

Further and additional objects of this invention will be apparent from the accompanying disclosure and drawing which illustrates schematically one embodiment of our invention.

We have discovered that if acetaldehyde-paraldehyde mixtures wherein the paraldehyde tends to revert to acetaldehyde are first treated with a stabilizing amount of a pyridine base that the acetaldehyde can be removed from the mixture by distillation without reversion of paraldehyde to acetaldehyde, and the remaining material comprising the paraldehyde can then be employed for the synthesis of alkyl pyridines.

The prevention of reversion of paraldehyde in the distillation of the aforesaid mixture can be substantially inhibited if the pyridine base is employed as the sole neutralizing agent, or if used after treatment of the said mixture with a stoichiometric excess of an aqueous solution of an alkali metal hydroxide, carbonate, or bicarbonate.

The pyridine bases which can be employed according to our invention include pyridine itself and alkyl pyridines containing not more than 12 carbon atoms in the alkyl groups. The preferred pyridine bases employed are the alkyl pyridines produced by the reaction between paraldehyde and ammonia in one step of our process, the primary product being 2 - methyl - 5 - ethylpyridine. Examples of alkyl pyridines which can be employed according to our invention include the collidines, lutadines, picolines, the various methylethyl pyridines, the diethyl pyridines, 2-isopropylpyridine, 2-propylpyridine, 2-methyl-3-propylpyridine, 2-ethyl-5-propylpyridine, 2 - methyl - 5-tert-butylpyridine, 2-ethyl-3-amylpyridine, 2 - decylpyridine, 2-butyl-5-octylpyridine and the like.

In one embodiment, the process of the present invention comprises the following integrated steps.

(1) Conversion of acetaldehyde to paraldehyde in a polymerization unit in the presence of an acid-type catalyst such as sulfuric acid, phosphoric acid, hydrochloric acid, or salts of various inorganic acids;

(2) Transfer of the reaction mixture from step 1 to an aldehyde treating zone where an excess of an aqueous solution of an inorganic basic material such as an alkali metal hydroxide, carbonate, or bicarbonate is added, separation of the aqueous and organic phases followed by addition of a small quantity of a pyridine base to the organic phase, and finally distillation of the resulting mixture to remove unreacted acetaldehyde which is recycled to the polymerization unit;

(3) Transfer of the bottoms product from step 2, containing the paraldehyde, to a reactor for the production of alkyl pyridines, addition of a suitable catalyst, introduction of an excess of ammonia, and adjustment of the temperature and pressure conditions to a level such that the ammonia will react with the paraldehyde to produce alkyl pyridines;

(4) Separation of the products of the process, recycling a small quantity of alkyl pyridine to the aldehyde treating zone (step 2), and recycling the unreacted ammonia to the pyridine synthesis step (step 3).

In the first step of the process acetaldehyde is converted to paraldehyde in the presence of an acid-type catalyst. It is generally the practice to charge a portion of paraldehyde to the reactor first, then introduced the catalyst, and finally add the acetaldehyde or, if desired, the acetaldehyde can be added continuously and the acid catalyst introduced at intervals during the course of the reaction. The conversion of acetaldehyde to paraldehyde is an exothermic reaction and can become violent unless properly controlled. It is therefore essential that the acetaldehyde be added at such a rate that the desired temperature can be maintained. Use of the paraldehyde as a reaction medium and introduction of the catalyst at intervals also aid in controlling the reaction. The mixture is agitated throughout the reaction.

As hereinbefore mentioned, acid-type catalysts are employed for the conversion of acetaldehyde to paraldehyde. The amount of catalyst charged is generally in the range between 0.03 and 5, preferably 0.05 and 3, weight percent based on the acetaldehyde used.

The conversion of acetaldehyde to paraldehyde is generally effected at temperatures in the range between 30 and 120° F., preferably between 40 and 110° F.

The residence time in the polymerization unit will vary depending upon the temperature used. It is intended that sufficient time be allowed for equilibrium between the paraldehyde and acetaldehyde to be reached at the temperature employed. In general, the residence time will be in the range between 10 minutes and 5 hours and usually it is not more than three hours.

The reaction mixture from the polymerization step is transferred to the aldehyde treating zone where an excess of an aqueous solution of an inorganic basic material such as an alkali metal hydroxide, carbonate, or bicarbonate is added and the mixture stirred or otherwise agitated for a period in the range from 10 minutes to three hours, more frequently from 30 minutes to two hours. Agitation is discontinued to allow the aqueous and organic phases to separate after which the aqueous phase is removed. A small amount of an alkyl pyridine is introduced, with stirring, into the organic phase after which it is distilled. Acetaldehyde which is taken overhead is recycled to the polymerization step. The bottoms product contains the paraldehyde.

Generally the inorganic basic material is sodium or potassium hydroxide, carbonate, or bicarbonate, with sodium compounds being more frequently used. Of the compounds which are applicable, the bicarbonates, particularly sodium bicarbonate, are preferred. An amount equal to at least the stoichiometric requirement, i. e., an amount sufficient to neutralize the acid catalyst, is employed and usually an excess is added such as from two to 10 times, generally not more than 5 or 6 times, the stoichiometric requirement. Subsequent to removal of the aqueous phase, an alkyl pyridine is then introduced and, after thorough mixing, acetaldehyde is removed by distillation. The alkyl pyridine employed is preferably that which is the major product of the process, i. e., 2-methyl-5-ethylpyridine. It is added in an amount in the range from 0.03 to 5 weight percent, preferably from 0.05 to 2 weight percent, based on the total aldehyde present. Treatment in this manner effects a degree of stabilization such that reversion of paralydehyde to acetaldehyde does not occur during distillation.

While it is possible to treat the acetaldehyde-paraldehyde mixture from the polymerization step with ammonia, either alone or after treating it with an alkali metal hydroxide, carbonate, or bicarbonate, there are disadvantages in connection with its use. Being volatile, it would be taken overhead with the acetaldehyde and would need to be separated prior to recycling the aldehyde to the polymerization unit, or, if not separated, more acid catalyst would need to be employed to neutralize the basic material prior to polymerization of the aldehyde. There is also a possibility that acetaldehyde-ammonia would form. When operating according to the process of this invention, a product of the process is used as a stabilizing material for the paraldehyde and no problems are involved in separating and recycling the acetaldehyde.

The bottoms product from the aldehyde treating zone is transferred to a reactor where the synthesis of alkyl pyridines is effected. The reactor is provided with an agitating means. The catalyst is added, air is removed by means of nitrogen or other inert gas, and excess ammonia is introduced, in aqueous solution or liquid phase. Ammonia and paraldehyde undergoing condensation are employed in mol ratios ranging from 1:1 to 12:1 but higher ratios can be used if desired. It is usually preferred to operate with mol ratios of ammonia to paraldehyde within the range from 2:1 to 10:1.

The ammonia for the reaction is usually employed in aqueous solution in concentrations ranging from 10 to 90 weight percent ammonia. Anhydrous liquid ammonia can also be used if desired.

Fluorine-containing catalysts are generally preferred in the pyridine synthesis step. They include hydrogen fluoride, ammonium fluoride, and ammonium bifluoride as well as other fluorine-containing materials. These catalysts are more completely described in U. S. Patent 2,615,022. Sulfonic acid catalysts can also be employed and those which are applicable contain not more than ten carbon atoms per molecule and include alkyl, cycloalkyl, aryl, alkaryl, and aralkyl sulfonic acids and various salts thereof such as ammonium salts and salts with organic bases, e. g., amines. These catalysts are more fully described in a copending application, Serial No. 264,838, filed January 3, 1952.

Catalysts are generally employed in relatively small amounts. Usually from 0.2 to 10.0, preferably from 1.5 to 5.0, weight percent of catalyst based on the paraldehyde is employed.

Optimum reaction temperatures for the alkyl pyridine synthesis step are within the range from 300 to 650° F., preferably 450 to 550° F. The reaction is usually effected in the liquid phase and, consequently, pressures at least sufficient to maintain the reaction mixture in the liquid phase are employed. When operating with a closed pressure reactor, the autogenous pressures developed by the reaction mixture at the reaction temperature are satisfactory. These pressures are usually within the range from 850 to 2500 pounds per square inch gauge. The reaction period, or residence time in the reactor, is generally in the range from five minutes to five hours, preferably no longer than two hours.

In some instances it may be found desirable to employ an emulsifying agent in the reaction mixture. It is preferred that any emulsifying agent so employed be soluble in at least one of the components of the reaction mixture. Emulsifying agents that can be used include salts of saturated or unsaturated fatty acids containing from six to 18 carbon atoms per molecule, sulfates such as lauryl sulfate, and sulfonates such as alkaryl sulfonates. Non-ionic detergents such as ethylene oxide condensation products of organic acids, alcohols, mercaptans, phenols, amides, and the like, as well as cationic surface active agents of the quaternary ammonium ion type are also considered applicable.

A small quantity of a phosphate glass of an alkali or alkaline earth metal, or a pyrophosphate of ammonia or an alkali or alkaline earth metal is frequently employed in the reaction mixture to aid in improvement of yields and/or assist in prevention of corrosion. These materials are more fully described in a copending application, Serial No. 165,098, filed May 29, 1950, with the quantities being the same as those designated in the earlier application.

At the end of the reaction period in step 3, the products are separated by any means desired. One method comprises transferring the effluent to a stripping zone where unreacted ammonia is removed and recycled to step 3. The remaining material is mixed with benzene or other suitable solvent to extract any organic material which is dissolved in the aqueous phase. The mixture is then transferred to a settling zone where the organic and aqueous phases are separated. Any water present in the organic phase is taken overhead as a water-benzene azeotrope during removal of the benzene and the alkyl pyridines are then separated by fractional distillation. Any other methods which can be employed for separation and recovery of the products are considered within the scope of the invention. A portion of alkyl pyridine, preferably 2-methyl-5-ethylpyridine, is recycled to the aldehyde treating zone (step 2).

Referring now in detail to the drawing illustrated is a preferred embodiment of our invention. Acetaldehyde from storage zone 10 passes through line 11 and valve 12 into line 13 where it is admixed with the proper amount of sulfuric acid, as hereinabove described, from storage zone 14 passing through line 15, valve 16, and pump 17. The resulting mixture is passed through circulating pump 20 and line 21 through cooler 22 and into polymerization column 23 via line 24 and valve 25 where it is maintained for the proper period of time to form an equilibrium mixture containing about 70 percent paraldehyde. Reaction mixture is withdrawn from the bottom of the polymerization column via line 26 through valve 27 at a rate which would be sufficient to empty the column in about 3 to 4 minutes and admixed with incoming acetaldehyde feed and recycled through circulating pump 20 and cooler 22. The purpose of this operation is to maintain proper temperature control. The acetaldehyde-paraldehyde mixture produced in polymerization reactor 23 is passed to neutralizer-separator 30 via line 31 through valve 32 at a rate sufficient to maintain the proper residence time of reactants in column 23 where it is agitated by means of mixer 33 with a stoichiometric excess of an aqueous solution of sodium carbonate, prepared in carbonate mixing zone 34 and passed to neutralizer-separator 30 via lines 35, pump 36, and valve 37. Suitable venting means such as line 40 and valve 41 are provided to neutralizer-separator 30 to prevent excessive build-up of pressure therein by the release of carbon dioxide in the neutralization of the sulfuric acid. Conical baffle 42 in separator 30 aids in the separation of the paraldehyde-acetaldehyde organic phase from water or sludge. The thus-treated mixture leaves separator 30 via line 43 through valve 44 and is admixed with a small amount of 2-methyl-5-ethylpyridine from line 45 in an amount sufficient to give the resulting mixture a pyridine base content within the range of 0.05 to 2 weight percent, based on the total aldehyde. The amount of 2-methyl-5-ethylpyridine mixing with the stream from separator 30 can be controlled by means of valve 46 and/or proportioning pump 47. Water and sludge from neutralizer-separator 30 are withdrawn as bottoms via line 48 and valve 49.

The resulting mixture is passed to vaporizer 50 which is maintained at a temperature of about 340° F. by means of coil 51. Acetaldehyde, paraldehyde and the added 2-methyl-5-ethylpyridine are vaporized therein along with other more volatile liquids and the vapor passed to paraldehyde column 52 via line 53 through valve 54. Heavier liquids and/or dissolved solids are removed from vaporizer 50 through line 55 and valve 56. Paraldehyde column 52 is packed with suitable material such as Raschig rings and the acetaldehyde from the mixture is recovered as overhead through lines 60 and valve 61, condensed in condenser 62 and passed via line 63 to accumulator 64. If desired a small amount of vapor can by-pass condenser 62 and pass directly to accumulator 64 through line 65 and valve 66. Condensed acetaldehyde from accumulator 64 is passed partly to reflux via lines 70 and valve 71 and partly recycled to the polymerization step via lines 72 and valve 73 by means of pump 74. Paraldehyde together with a small amount of water along with the added methylethylpyridine form the kettle product. A small amount of material is withdrawn from the bottom of the column through line 75 and passed through reboiler 76 and line 77 to paraldehyde column 52. Kettle product is withdrawn from near the bottom of paraldehyde column 52 through line 80 and valve 81 and passed to cooler 82 from whence it proceeds via line 83 to paraldehyde surge zone 84.

In practice, the bottoms from separator 30, vaporizer 50 and paraldehyde column 52 are generally discarded. However, these bottoms can be passed to paraldehyde sludge separator 85 and any light organic phase which accumulates therein recycled to separator 30 via lines 86 and 87. This practice, however, is optional.

Paraldehyde from surge 84 passing through valve 90 and line 91 is mixed with aqua ammonia from zone 92 passing through line 93 and valve 94 in a ratio as hereinabove described. The resulting mixture is passed via line 95 to preheater 96 where it is preheated to a temperature in the range of 450 to 550° F. The thus-heated mixture is passed to reactor 97 via line 98 where it is contacted with ammonium bifluoride and subjected to pressures sufficient to result in the production of alkyl pyridines, predominantly 2-methyl-5-ethyl-pyridine. Effluent from reactor 97 leading through line 100 is passed to purification zone 101 from which methylethylpyridine is recovered via line 102 as a product of the process. A small amount of the methylethylpyridine is recycled via line 103 to pump 47, where it is passed into admixture with the organic phase leaving neutralizer separator 30.

It is possible, though not preferred, to mix the recycle methylethylpyridine with a small amount of paraldehyde before recycling to vaporizer 50.

*Example I*

2-methyl-5-ethylpyridine is produced by first charging paraldehyde to a polymerization unit, adding concentrated sulfuric acid, adjusting the temperature to 105° F., and then introducing acetaldehyde slowly while the mixture is stirred. Since the reaction is exothermic, the acetaldehyde is added at a rate such that the temperature can be maintained at the desired level. Subsequent to the addition of the acetaldehyde, the mixture is stirred for about an hour. The reaction mixture is then transferred to a treating zone where sodium carbonate, in the form of an aqueous solution containing 13.5 weight per cent sodium carbonate, is added and the mixture stirred for one hour after which the aqueous phase is separated and a small quantity of 2-methyl-5-ethylpyridine is introduced into the organic phase. After thorough mixing the material is distilled to remove the acetaldehyde. The acetaldehyde which is taken overhead is recycled to the polymerization zone. Of the total aldehyde charged to the polymerization step, 72.1 weight per cent is obtained as paraldehyde. The bottoms product which comprises paraldehyde is transferred to a pressure reactor where the synthesis of 2-methyl-5-ethylpyridine is effected. Ammonium bifluoride and sodium hexametaphosphate are introduced, air is swept out of the reactor with nitrogen, and finally ammonia is added in the form of an aqueous solution. The reactor is closed and the temperature is raised to the desired level. Agitation of the reactor is effected by an electrically driven platform rocker. At the end of the reaction period the mixture is transferred to an ammonia stripper where the ammonia is removed and can be recycled to the pyridine synthesis step. Benzene is added to extract pyridine bases from the aqueous phase, the aqueous and organic phases are separated, water is distilled along with the benzene as a water-benzene azeotrope, and 2-methyl-5-ethylpyridine is separated by fractional distillation. A small amount of the 2-methyl-5-ethylpyridine is recycled to the aldehyde treating step as needed. The following table shows the amounts of materials, reaction conditions, and yield of 2-methyl-5-ethylpyridine:

Aldehyde polymerization step:
    Paraldehyde, grams _____ 31
    Acetaldehyde, grams _____ 205
    Sulfuric acid, grams_____ 0.36
    Temperature, ° F_____ 105
    Time after acetaldehyde addition, hours___ 1.0
Aldehyde treating step:
    Sodium carbonate, grams_____ 1.17
    2-methyl-5-ethylpyridine, grams _____ 0.24

Pyridine synthesis step:
| | |
|---|---|
| Paraldehyde from previous step, grams | 170 |
| Paraldehyde from previous step, mols | 1.286 |
| Ammonium bifluoride, grams | 2.0 |
| Sodium hexametaphosphate, grams | 1.0 |
| Ammonia, grams | 173.0 |
| Ammonia, mols | 10.17 |
| Mol ratio ammonia/paraldehyde | 7.91 |
| Water, grams | 211.0 |
| Grams NH$_3$/100 grams water | 82.3 |
| Residence time in reactor, hours | 0.5 |
| Temperature, °F | 490–500 |
| Per pass yield of 2-methyl-5-ethylpyridine (mol percent of theoretical based on paraldehyde charged to pyridine synthesis step) | 81 |

*Example II*

Four runs were made for the preparation of a paraldehyde-acetaldehyde equilibrium mixture in the presence of sulfuric acid as a catalyst and separation of the paraldehyde therefrom by treatment with an excess of a neutralizing basic material, separation of the aqueous phase when necessary, and distillation of the organic phase to remove the acetaldehyde. For each run approximately 300 grams of paraldehyde was charged to a reactor equipped with a stirrer and a means for temperature control. Concentrated sulfuric acid was then added and acetaldehyde was introduced under 40 p. s. i. g. nitrogen pressure. Approximately two hours were required for the addition of 2000 grams of acetaldehyde. The temperature was kept between 102 and 109° F. during addition of the acetaldehyde and maintained 105° F. for 30 minutes to one hour thereafter to allow time for the reaction mixture to reach equilibrium. Each acetaldehyde-paraldehyde equilibrium mixture was treated with a different basic material, using approximately three times the stoichiometric requirement, the aqueous phase separated when necessary, and the organic phase was then distilled. A description of each of them follows:

(1) Sodium carbonate was added as a 13.5 weight per cent aqueous solution and the mixture was stirred vigorously for an hour after which the aqueous phase was separated and the organic phase distilled to separate the acetaldehyde from the paraldehyde (boiling point of acetaldehyde, 70° F.; boiling point of paraldehyde, 255° F.). This treatment did not prevent reversion of paraldehyde to acetaldehyde, as shown in the table.

(2) Sodium hydroxide was added as a 10.5 weight percent aqueous solution and the mixture was stirred vigorously as before. After separation of the aqueous phase, the organic phase was distilled. Some reversion of paraldehyde to acetaldehyde occurred upon distillation.

(3) Treatment with sodium carbonate was effected as in (1) and one percent 2-methyl-5-ethylpyridine, based on the total weight of aldehyde charged, was added. Substantially no reversion of paraldehyde to acetaldehyde occurred when the mixture was distilled.

(4) Methyl-ethyl pyridine was added in an amount of about 1.4 percent and the mixture was stirred vigorously. The mixture was then distilled. A slight amount of reversion of paraldehyde to acetaldehyde occurred during distillation, but not to the extent that occurred when only an inorganic material was used as a neutralizing agent.

The foregoing examples are illustrative of the principles of our invention and should not be construed as unduly limiting.

We claim:

1. A process for the prevention of reversion of paraldehyde in the distillation of a mixture of acetaldehyde and paraldehyde wherein the paraldehyde tends to revert to acetaldehyde, which comprises incorporating in said mixture before distillation a stabilizing amount of a pyridine base.

2. A process for the prevention of reversion of paraldehyde in the distillation of a mixture of acetaldehyde and paraldehyde wherein the paraldehyde tends to revert to acetaldehyde, which comprises incorporating in said mixture before distillation a stabilizing amount of a pyridine base selected from the group consisting of pyridine and an alkyl-substituted pyridine containing from one to 12 carbon atoms in the alkyl groups.

3. A process for the prevention of reversion of paraldehyde in the distillation of a mixture of acetaldehyde and paraldehyde wherein the paraldehyde tends to revert to acetaldehyde, which comprises incorporating in said mixture before distillation a stabilizing amount of 2-methyl-5-ethylpyridine.

4. An improved process for the production of paraldehyde which comprises polymerizing acetaldehyde in the presence of an acid-type catalyst to produce an equilibrium mixture of acetaldehyde and paraldehyde, contacting the resultant mixture with a stoichiometric excess of an aqueous solution of an inorganic neutralizing agent selected from the group consisting of alkali metal carbonate, bicarbonate and hydroxide, recovering the organic phase from the resulting mixture, incorporating in said organic phase a stabilizing amount of a pyridine base, subjecting the resulting mixture to a fractional distillation step, and recovering paraldehyde as a kettle product from said distillation step.

5. A process according to claim 4 wherein the pyridine base is selected from the group consisting of pyridine and an alkyl-substituted pyridine containing from 1 to 12 carbon atoms in the alkyl groups.

6. A process according to claim 4 wherein 2-methyl-5-ethylpyridine is the pyridine base employed.

7. In a process wherein an acidic mixture of acetaldehyde and paraldehyde is neutralized and is then subjected to fractional distillation to effect separation of the acetaldehyde from the paraldehyde, during which step the paraldehyde tends to revert to acetaldehyde, the improvement comprising adding to the mixture prior to distillation 0.05–2% by weight of 2-methyl-5-ethylpyridine based on the total weight of aldehydes, whereby

| | Runs | | | | Controls [1] | |
|---|---|---|---|---|---|---|
| | 1 | 2 | 3 | 4 | 1 | 2 |
| H$_2$SO$_4$ added, percent, based on acetaldehyde charged | 0.18 | 0.18 | 0.18 | 0.18 | | |
| Basic material | Na$_2$CO$_3$ | NaOH | Na$_2$CO$_3$+MEP [2] | MEP | | |
| Basic material, percent, based on acetaldehyde charged | 0.57 | 0.45 | 0.57+1.0 [3] | 1.4 | | |
| Distillation: | | | | | | |
| Overhead to 176° F., percent | 67 | 58 | 18.3 | 18.5 | 0 | 16.3 |
| Overhead, 176–243° F., percent | | | 9.6 | | 0 | 4.4 |
| Overhead and residue above 243° F., percent | | | 72.1 | | 100 | 79.3 |
| Acetaldehyde in charge by analysis, percent | 17.0 | | 17.0 | 16.4 | | 20.0 |
| Acetaldehyde in fractionation, percent | >67 | >58 | 18.3 | >18.5 | 0 | 253 |
| Highest head temperature, °F | 70 | 70 | 255 | 234 | 252 | |
| Reversion to acetaldehyde | yes | yes | no | yes, slight | no | no |

[1] Control 1 was pure paraldehyde and control 2 was a synthetic mixture of paraldehyde and acetaldehyde.
[2] 2-methyl-5-ethylpyridine.
[3] The one percent 2-methyl-5-ethylpyridine was based on the total aldehyde charged.

the reversion of paraldehyde to acetaldehyde during distillation is inhibited.

8. A mixture of acetaldehyde and paraldehyde, wherein the paraldehyde tends to revert to acetaldehyde, said mixture containing from about 0.03 to 5.0 weight percent, based on the total aldehyde present, of a pyridine base to inhibit the reversion.

9. The composition of claim 8 wherein said pyridine base is selected from the group consisting of pyridine and alkyl-substituted pyridines containing from 1 to 12 carbon atoms in the alkyl groups.

10. The composition of claim 9 wherein said pyridine base is 2-methyl-5-ethylpyridine.

11. An improved process for the production of paraldehyde which comprises polymerizing acetaldehyde in the presence of an acid-type catalyst to produce an equilibrium mixture of acetaldehyde and paraldehyde, contacting the resultant mixture with a stoichiometric excess of an aqueous solution of an inorganic base, recovering the organic phase from the resulting mixture, incorporating in said organic phase a stabilizing amount of a pyridine base, subjecting the resulting mixture to a fractional distillation step, and recovering paraldehyde as a kettle product from said distillation step.

References Cited in the file of this patent

UNITED STATES PATENTS

| | | |
|---|---|---|
| 1,612,032 | Lichtenhahn | Dec. 28, 1926 |
| 2,318,341 | Thompson | May 4, 1943 |
| 2,615,022 | Mahan | Oct. 21 1952 |

FOREIGN PATENTS

| | | |
|---|---|---|
| 147,000 | Great Britain | Mar. 17, 1921 |
| 488,595 | Canada | Dec. 2, 1952 |